(12) United States Patent
Iannone et al.

(10) Patent No.: US 11,229,908 B2
(45) Date of Patent: Jan. 25, 2022

(54) MICROFLUIDIC DEVICE, PARTICULARLY OF THE LAB-ON-CHIP TYPE, FOR THE CONCENTRATION, PURIFICATION, AND DETECTION OF BIOLOGICAL AND/OR MEDICAL TARGETS OF INTEREST FROM A BIOLOGICAL SAMPLE

(71) Applicant: DIANAX S.R.L., Milan (IT)

(72) Inventors: Eugenio Iannone, Milan (IT);
Maurizio Moroni, Milan (IT);
Giacomo Germani, Buccinasco (IT)

( * ) Notice: Subject to any disclaimer, the term of this patent is extended or adjusted under 35 U.S.C. 154(b) by 0 days.

(21) Appl. No.: 16/333,817

(22) PCT Filed: Sep. 15, 2017

(86) PCT No.: PCT/EP2017/073364
§ 371 (c)(1),
(2) Date: Mar. 15, 2019

(87) PCT Pub. No.: WO2018/050867
PCT Pub. Date: Mar. 22, 2018

(65) Prior Publication Data
US 2019/0232281 A1    Aug. 1, 2019

(30) Foreign Application Priority Data

Sep. 15, 2016    (WO) .................. PCT/IT2016/000211

(51) Int. Cl.
*B01L 3/00*        (2006.01)
*G01N 27/447*      (2006.01)

(52) U.S. Cl.
CPC ... *B01L 3/502715* (2013.01); *B01L 3/502753* (2013.01); *G01N 27/447* (2013.01); *G01N 27/44791* (2013.01); *B01L 2200/0631* (2013.01); *B01L 2200/10* (2013.01); *B01L 2300/0645* (2013.01); *B01L 2300/0838* (2013.01); *B01L 2400/0406* (2013.01); *B01L 2400/0421* (2013.01);
(Continued)

(58) Field of Classification Search
None
See application file for complete search history.

(56) References Cited

U.S. PATENT DOCUMENTS 5,264,101 A * 11/1993 Demorest ........ G01N 27/44752
                                                      204/452
2002/0124879 A1    9/2002 Kaplan et al.
(Continued)

FOREIGN PATENT DOCUMENTS

WO         03011768 A2      2/2003
WO    WO-2015040009 A1 *   3/2015    .......... B01L 3/50273

OTHER PUBLICATIONS

International Search Report from PCT/EP2017/073364 dated Nov. 28, 2017.

*Primary Examiner* — J. Christopher Ball
(74) *Attorney, Agent, or Firm* — Abelman, Frayne & Schwab; Stefan Knirr

(57) ABSTRACT

A microfluidic device, particularly of the lab-on-chip type, for the detection of biological and/or medical targets of interest in biological samples, as well as for the operations of extraction of such targets from native or non-native biological samples, of purification, concentration, and injection in buffer solutions, all adapted to optimize the detection thereof.

16 Claims, 2 Drawing Sheets

(52) U.S. Cl.
 CPC .............. *B01L 2400/0677* (2013.01); *B01L 2400/0688* (2013.01); *B01L 2400/0694* (2013.01)

(56) References Cited

U.S. PATENT DOCUMENTS

2004/0050700 A1    3/2004    Lopez-Canovas et al.
2016/0207043 A1    7/2016    Iannone et al.

\* cited by examiner

MICROFLUIDIC DEVICE, PARTICULARLY OF THE LAB-ON-CHIP TYPE, FOR THE CONCENTRATION, PURIFICATION, AND DETECTION OF BIOLOGICAL AND/OR MEDICAL TARGETS OF INTEREST FROM A BIOLOGICAL SAMPLE

FIELD OF THE INVENTION

The present invention relates to a microfluidic device, particularly of the lab-on-chip type, for the detection of biological and/or medical targets of interest in biological samples, as well as for the operations of extraction of such targets from native or non-native biological samples, of purification, concentration, and injection in buffer solutions, all adapted to optimize the detection thereof.

STATE OF THE ART

It is known that one of the crucial steps for the quantification of targets of biomedical interest in native or non-native biological samples is bringing the target into the detection area under optimal conditions for the detector to be able to perform an adapted qualitative and/or quantitative reading of the target. In fact biological samples have an extremely complex composition that, in addition to the sought target, also contains numerous disruptive components that can distort the measurement.

The apparatuses currently on the market, in many cases, use more or less complex molecules immobilized on the surface of a detector (for example, in a proteinic context, specific antibodies) so as to constitute the correct concentration in the detection area for the measurement, but not only is this process expensive in terms of the price of the immobilized molecules, but also it is often not rigorously specific and, last but not least, it puts precise restrictions of conservation and duration on the purification devices that can be used.

Likewise, some other apparatuses have, upstream of the detection, electrophoretic chambers with non-integrated gels (such as for example the gel commercially known with the name PhastGel), which are expensive and not easily manageable.

SUMMARY OF THE INVENTION

The aim of the present invention is to provide a microfluidic device, particularly of the lab-on-chip type, for the detection of biological and/or medical targets of interest in biological samples, which overcomes the limitations of the known art, making it possible to obtain efficient and precise detections of proteinic target.

Within this aim, an object of the invention is to provide a microfluidic device and related method that makes it possible to purify and at the same time concentrate and prepare the target contained in the biological sample in order to execute a correct and precise detection analysis of said target.

Another object of the invention is to provide a microfluidic device and related method that ensures a greater and better manageability of use, as well as a longer-lasting conservability of its sensitive and/or perishable parts.

Another object of the invention is to provide a microfluidic device and related method that ensures the conservability and unalterability of the biological sample and of the reagent solutions used.

Another object of the invention is to provide a microfluidic device and related method that is capable of offering the widest guarantees of reliability and safety in use, and which is extremely versatile with respect to conventional devices, which often are specific to determined targets.

Another object of the invention is to provide a microfluidic device that is easy to implement and economically competitive when compared to the known art.

This aim and these and other objects which will become better apparent hereinafter are achieved by a microfluidic device according to claim 1.

Further characteristics and advantages of the invention will become better apparent from the detailed description of a preferred, but not exclusive, embodiment of a microfluidic device, which is illustrated by way of non-limiting example with the aid of the accompanying drawings.

DETAILED DESCRIPTION OF THE INVENTION

Figure 1:
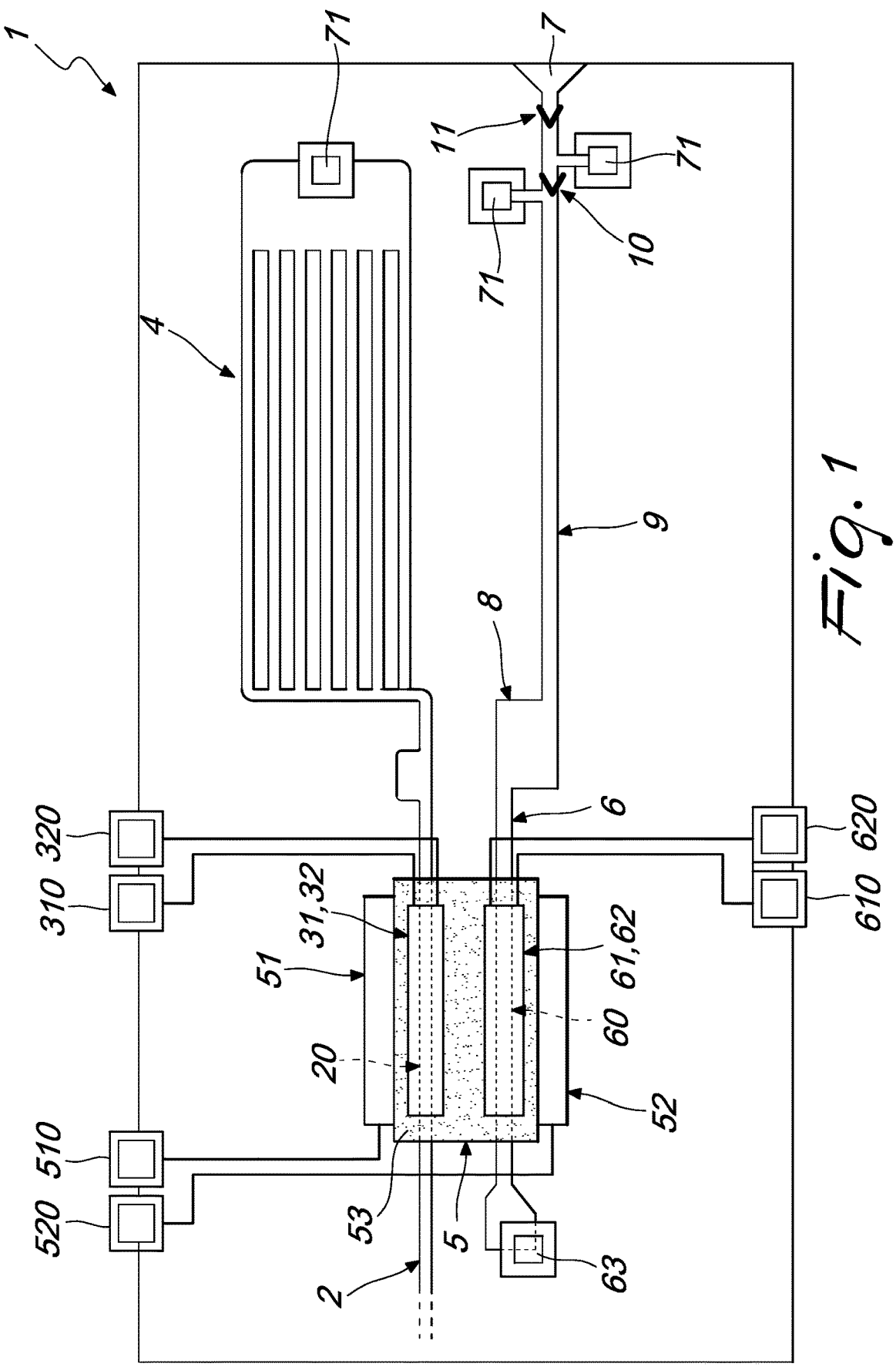
FIG. 1 is a schematic circuit diagram of an embodiment of a microfluidic device, according to the invention.

With reference to the figures, the microfluidic device, particularly of the lab-on-chip type, for the detection of biological and/or medical targets of interest in native or non-native biological samples, is generally designated by the reference numeral 1.

The device 1 further also makes possible operations of extraction of such proteinic targets from biological samples, of purification, concentration and injection in buffer solutions, all adapted to optimize the detection thereof.

According to the invention, the device 1 comprises:

a capillary insertion duct 2 for insertion of a biological sample containing a target;

an electrophoresis chamber 5, containing an electrophoretic material stationary phase 53, wherein such electrophoresis chamber 5 is in capillary connection with the capillary insertion duct 2 along an insertion section 20 of the capillary insertion duct 2;

a pair of insertion electrodes 31, 32 arranged across the insertion section 20 which are adapted to generate an electrical field capable of extracting and injecting dynamically, into the electrophoresis chamber 5, the target contained in the biological sample, while the biological sample is in motion along the insertion section 20, so that, as a result of such dynamic injection, the target becomes concentrated in the electrophoresis chamber 5;

a microfluidic pump 4, in capillary connection with the capillary insertion duct 2, which is configured to maintain the biological sample in motion along the capillary insertion duct 2 at a speed adapted to allow such dynamic injection of the target into the electrophoresis chamber 5.

According to the invention, the electrophoresis chamber 5 further comprises a pair of electrophoresis electrodes 51, 52 which are adapted to generate an electrical field capable of making the target that has been concentrated in the electrophoresis chamber 5 undergo a purifying electrophoretic run through the electrophoretic material 53.

The microfluidic device 1 further comprises, according to the invention:

a capillary extraction duct 6 adapted to receive the target that has been concentrated and purified in the electrophoresis chamber 5, wherein the electrophoresis chamber 5 is in capillary connection with the capillary extraction duct 6 along an extraction section 60 of the capillary extraction duct 6;

a detection chamber 8, in capillary connection with the capillary extraction duct 6, in which the presence is detected of the concentrated and purified target;

a pair of extraction electrodes 61, 62 arranged across the extraction section 60 which are adapted to generate an electrical field capable of injecting, into the extraction section 60 of the capillary extraction duct 6, the target that has been concentrated and purified in the electrophoresis chamber 5.

Advantageously the capillary insertion duct 2 is configured to be interfaced with a device for the pre-treatment of the biological sample, for instance, the insertion duct 2 can be arranged to be in fluidic connection with the outlet duct of a device for the pre-treatment of the biological sample.

The microfluidic device 1 advantageously comprises at least one single-use valve 10, 11 adapted to maintain in static position the target present in the capillary extraction duct 6.

Advantageously the electrophoresis chamber 5 comprises the pair of electrophoresis electrodes 51, 52, the pair of insertion electrodes 31, 32, and the pair of extraction electrodes 61, 62. The pair of insertion electrodes 31, 32 and the pair of extraction electrodes 61, 62 are arranged substantially at right angles with respect to the pair of electrophoresis electrodes 51, 52. In this manner the pair of insertion electrodes 31, 32 and the pair of extraction electrodes 61, 62 respectively generate an insertion electrical field of the target and an extraction electrical field of the target which are substantially perpendicular to the electrophoresis electrical field generated by the pair of electrophoresis electrodes 51, 52.

Figure 2:
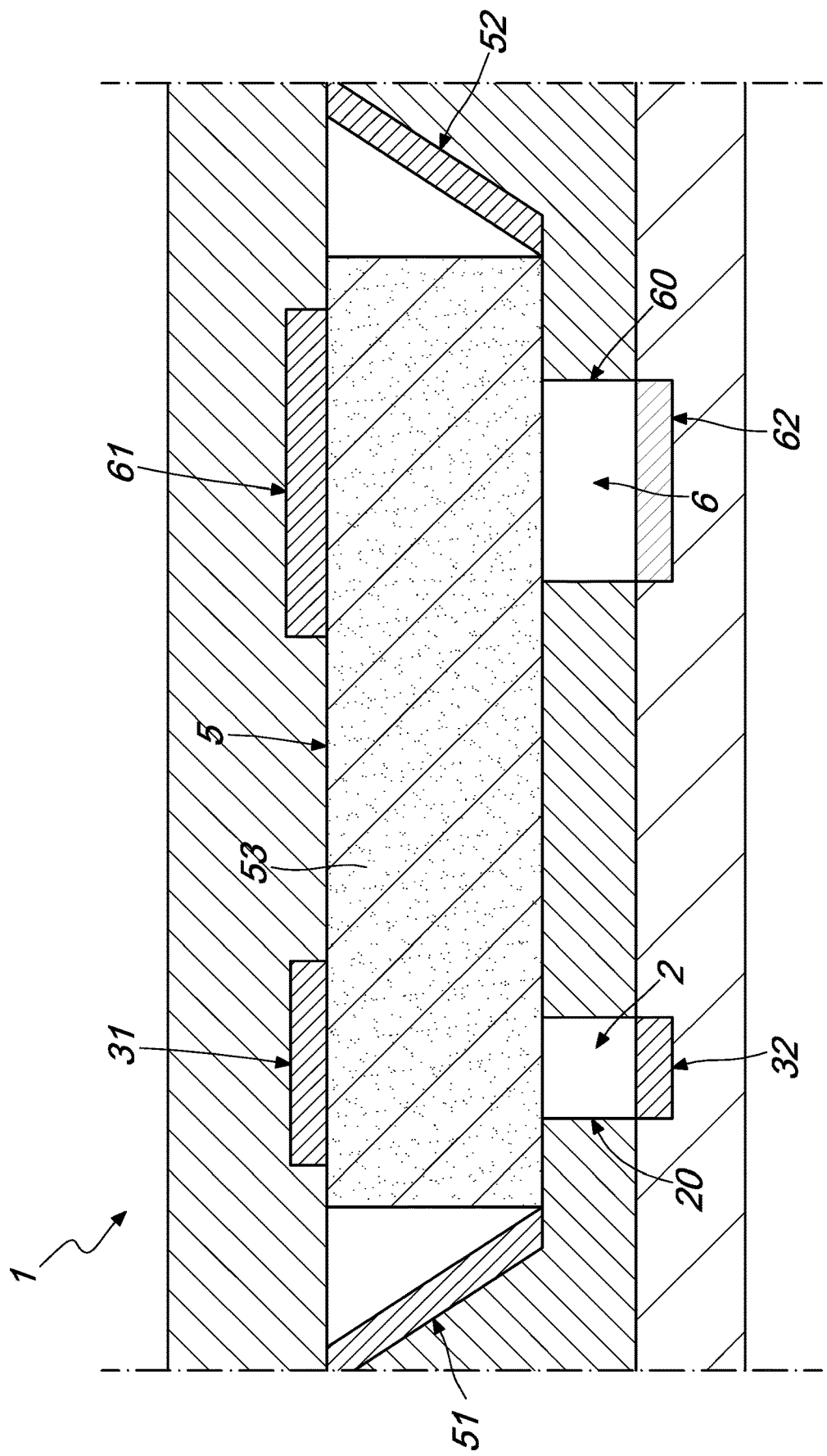
FIG. 2 is a schematic diagram of a detail of the device of FIG. 1, illustrating in particular the electrophoresis chamber.

Advantageously, as illustrated in FIG. 2, the electrodes 51 and 52 of the pair of electrophoresis electrodes are arranged at least partially in contact with the electrophoretic material 53. Preferably such electrodes 51 and 52 are arranged fully in contact with the electrophoretic material 53.

In this manner the electrophoresis field generated is more effective in that it does not suffer from dispersion and/or screens of any non-electrophoretic materials interposed between the pair of electrodes.

Advantageously, the electrodes 31, 32 of the pair of insertion electrodes are arranged respectively in contact with the electrophoretic material 53 and with the biological sample in motion along the insertion section 20 of the capillary insertion duct 2.

This contrivance makes the extraction of the target from the biological sample and its penetration into the electrophoresis chamber 5 more efficient.

Similarly the electrodes 61, 62 of the pair of extraction electrodes 61, 62 are arranged respectively in contact with the electrophoretic material 53 and with the target present in the extraction section 60 of the capillary extraction duct 6.

This contrivance makes the injection of the target, present in the electrophoresis chamber 5 in concentrated and purified form, into the extraction duct 6, and thence into the detection chamber 8, more effective.

Advantageously the intensity of the electrical field generated by the pair of insertion electrodes 31, 32 is calibrated on the basis of one or more of the following parameters:

the speed of the flow of the biological sample imposed by the microfluidic pump 4, the specific mass of the target to be extracted from the biological sample, the specific charge of the target to be extracted from the biological sample.

In the electrophoresis chamber 5, an increase occurs of the concentration of the target by virtue of the dynamic injection from the biological sample that slides along the insertion duct 2, and at the same time a separative electrophoresis occurs which enables the extraction of the target to be detected with a degree of concentration and purification that is optimized for subsequent detection in the detection chamber 8.

The biological sample of fluid, containing the target to be detected and other various accompanying elements, is loaded by way of the insertion duct 2 for direct injection or by way of specific devices, and is kept in motion, at an adapted speed and therefore at an appropriate flow rate, from the capillary valve 4, until it is conveyed into the insertion section 20. Here the two insertion electrodes 31 and 32 are conveniently present, between which a field is applied the intensity of which is conveniently calibrated on the speed of flow imposed by the capillary valve 4, and/or on the mass and/or on the specific charge of the target.

Under the action of the electrical field, the target is dynamically injected into the appropriate electrophoretic material 53 which is chosen as a function of such target, or of the classes the target belongs to. In this manner, all of the target present in the entire volume of biological sample that flows through the field applied between the insertion electrodes 31, 32 is advantageously injected dynamically, and therefore a high concentration of the target is produced, differently from conventional systems, which are limited to injecting the biological sample according to preset volumes and under static conditions, i.e. in the absence of a flow of such biological sample.

Advantageously the electrophoresis chamber 5 comprises a pair of electrophoresis electrodes 51 and 52 which are configured to generate an electrical field that passes through the electrophoretic material 53, advantageously of the type of hydrogel, conveniently chosen on the basis of the chemical/physical characteristics of the class of target to be analyzed present in the chamber 5, in order to separate the target present in the pre-purified portion that has been injected into the electrophoresis chamber 5. Such electrophoresis electrodes 51 and 52 are advantageously arranged at two opposite sides of the electrophoresis chamber 5 and are adapted to govern the phenomenon of separative electrophoresis which serves to separate the target to be detected. Preferably the electrophoresis electrodes 51 and 52 are advantageously arranged in a way that, one of said electrophoresis electrodes is proximal to the insertion section 20 of the duct 2 and the other one is proximal to the extraction section 60 of the duct 6. The field generated between the electrophoresis electrodes 51 and 52 is conveniently calibrated on the basis of the mass and the charge of the target so that the electrophoretic run brings such target to the extraction section 60 of the extraction duct 6.

At the extraction section 60 the device 1 advantageously comprises the pair of extraction electrodes 61 and 62 which are configured to generate an electrical field conveniently calibrated on the chemical-physical characteristics of the target and adapted to extract the purified portion of the target from the electrophoretic material 53 through the extraction section 60 of the duct 6, injecting it into a buffer solution conveniently chosen to optimize the detection and quantification of the target.

As illustrated in FIG. 2, the injection electrodes 31 and 32 can be arranged respectively above and below the insertion section 20 of the duct 2, and, similarly, the extraction electrodes 61 and 62 can be arranged respectively above and below the extraction section 60 of the duct 6. Advantageously the electrodes 32 and 62 are in direct contact with the respective liquids while the electrodes 31 and 61 rest directly on the electrophoretic material 53, in this manner making it possible to maximize the effects of the respective fields.

The volumes of sample in motion in the insertion duct 2 and electroinjected through the insertion section 20 are generally of the order of a microliter, but by virtue of the dynamic injection process, by conveniently configuring the capillary valve 4 it is possible to handle various magnitudes of volumes so as to arrive at concentrations of targets that can be detected even if present in the starting sample in extremely low quantities.

In other words, the dynamic injection makes it possible to accumulate, in a manner variable according to the specific requirements, the target to be purified inside the electrophoresis chamber 5, by dynamically flowing the biological sample through the insertion duct 2.

The device 1 advantageously comprises a hole 63 that can be used for loading operating solutions into the electrophoresis chamber 5.

The device 1 further advantageously comprises a capillary suction duct 9, in capillary connection with the detection chamber 8 and comprising at least one single-use valve 10, 11, the breakage of which favors the movement of the target from the extraction duct 6 to the detection chamber 8.

In this manner, the electrophoresis chamber 5 and the detection chamber 8 are connected by the extraction duct 6 by virtue of the capillary drawing force exerted by the capillary suction duct 9 after the breakage of the two single-use valves 10 and 11, wherein the valve 11 acts in particular as a protection valve.

Such capillary suction duct 9 is conveniently calibrated in length and cross-section in order to allow the filling of the detection chamber 8 quantitatively with the volume of buffer solution containing the target to be detected and optionally to be quantified. The buffer solution is advantageously a saline solution with chemical/physical properties useful to maintaining the target, now purified of unwanted accompanying substances, in solution, at the correct concentration for the subsequent step of detection and in the best conditions to ensure the optimal response to the detection.

The diagnostic device 1 advantageously comprises a hole 70 connected to the single-use valves 10 and 11, which is adapted to allow the insertion of a needle in order to cause the breakage of such valves.

Furthermore there can be a plurality of further perforable bodies 71, adapted to allow the venting of compressed air that accumulates in the capillary ducts.

The detection chamber 8 is advantageously a chamber containing the adapted apparatuses for the optimal detection of the target under examination (electrochemical, fluorescent).

Advantageously the insertion duct 2 comprises at least one longitudinal portion that has a transverse cross-section of greater area with respect to the transverse cross-section of the remaining longitudinal portion, which defines an expansion volume. Such expansion volume is adapted to allow the blocking of the fluid present initially, in order to keep conditioned the areas that cannot become dry, such as the electrophoresis chamber 5, in order to prevent the deterioration of the electrophoretic material 53 present therein.

Advantageously, the insertion duct 2, the electrophoresis chamber 5, the extraction duct 6, the capillary pump 4, the detection chamber 8, and the suction duct 9 are defined in a single chip and comprise inert containment surfaces, i.e. surfaces that are chemically and/or physically non-activated, i.e. surfaces that have not undergone particular processing to render them chemically and/or physically reactive.

Preferably all the structures di chambers, conduits, and capillary ducts are provided in a single chip, which can be provided by way of electronic lithography techniques.

Advantageously the chip can be provided starting from one or more wafers of adapted material, superimposed. Chambers, ducts and conduits can be advantageously made of the semiconductor material of the chip by way of vertical etching, or other conventional methods in the sector.

The device 1 is particularly adapted for the purification, concentration, and detection of targets of biomedical interest, such as proteins of various types, in physiological fluids, such as blood, urine, saliva, by way of tests of various types including immunological, chemical, or direct detection tests. Advantageously the device 1 is also adapted to be applied in the food industry sector, where liquids such as milk and wine can be analyzed in order to determine their quality, sophistication and presence of any harmful substances. Also, advantageously the device 1 is also adapted to be applied in the veterinary and animal management sector where fluids of an animal nature can be analyzed for the purpose of diagnosis, monitoring of the development of diseases and the progress of treatments. Also, advantageously the device 1 is also adapted to be applied in the industrial and/or civil sector where fluids such as sewage and/or native water can be monitored in order to determine the degree of pollution.

The device 1 is also capable of operating directly with biological samples that come directly from the donor without prior processing, such as for example a drop of blood obtained from pricking a finger.

Advantageously, each electrode 31, 32, 51, 52, 61, 62, comprises a respective point of electrical contact 310, 320, 510, 520, 610, 620, which is accessible externally to the chip in which the device 1 is provided. Each point of electrical contact 310, 320, 510, 520, 610, 620 is connectable to suitable means of electrical voltage supplying.

The microfluidic device (1) according to the present invention can be used with known electrophoresis gel for proteins like, for instance, polyacrylamide gel. The best results are achieved employing customized electrophoresis gel and electrophoretic customized cellulose.

Pre-polymerization of gel sheets allows dividing the back-end chip fabrication from the gel polymerization process. The process of providing the electrophoretic material to the electrophoretic chamber of the device according to the invention may comprise cutting a pre-polymerized sheet of electrophoretic material (53) into a piece specially adapted to be inserted into the electrophoretic chamber (5) lying on the chamber floor.

The pre-polymerized sheet of electrophoretic material (53) can be polymerized on a solid support made, as an example, of polymethylmethacrylate (PMMA).

A small compression of the electrophoretic material is applied at the insertion into the electrophoretic chamber (5) in order to obtain a good contact between the electrophoretic material (53) and the floor of the chamber (5), thus avoiding the formation of liquid film on the bottom of the electrophoretic material (53). Advantageously hydrophobic treatment of the floor of the electrophoretic chamber (5) can be employed. This can be obtained, for instance, by deposition of a hydrophobic polymer, obtaining cracks levelling too.

Since the electrophoresis gel is inserted in the electrophoresis chamber before closing the chip with the upper cap, it is important to avoid the formation of a liquid film between the gel and the floor of the electrophoresis chamber. The formation of a liquid film on top of the gel can be avoided by specific design of the electrophoresis chamber and of the upper cap.

Preferably the upper cap of the microfluidic device (1) is therefore designed in order to obtain a good contact between the electrophoretic material (53) and the upper cap, thus avoiding the formation of liquid film on the top of the electrophoretic material (53).

The operation of the microfluidic device 1, particularly for a lab-on-chip, is clear and evident from the foregoing description.

In particular, the method of detection of a target in a native or partially processed sample of a fluid to be tested, by way of the device 1, is briefly described below.

A native or conveniently processed sample, i.e. the fraction containing the target or targets of interest, proceeds along the insertion duct 2 toward the electrophoresis chamber 5 until it reaches the insertion section 20 where, by way of the action of the field generated between the insertion electrodes 31 and 32, it is injected into the electrophoretic material 53.

In the passage through the electrophoresis chamber 5 the components contained in the sample with the target are separated by electrophoresis under the action of the field generated between the electrophoresis electrodes 51 and 52, and the purified and concentrated target, on reaching the extraction section 60, is extracted and injected into the analysis buffer solution in the extraction duct 6, so that it can reach the detection chamber 8. In the detection chamber 8, the detection and quantification of the target are obtained by way of adapted assays, of the electrochemical type or of another nature.

For example, if a protein target is to be detected, the assay can contain specific tags.

Alternatively, the assay can contain other reagent solutions for the detection of non-proteinic targets such as, for example, mRNA, DNA, organic or inorganic ionic molecules such as for example metallic pollutants and the like.

The device 1 conveniently and automatically sets the measurement parameters based on the detected conditions of pressure, temperature and humidity. For the detection of the target there is, according to the characteristics of the target to be analyzed, a wide range of known detection methods, including interferometric and electrochemical methods.

Capillarity is the motor that makes it possible for the sample to move in the ducts and conduits of the device 1, as long as the air contained in the circuit itself is able to conveniently compress and expand in order to prevent the capillary pressure from being insufficient to enable the movement of the sample.

With particular regard to the electrophoresis chamber 5, it should be noted that in order to allow the penetration of the purified portion of the sample stabilized in the electrophoretic material 53 on the vertical of the insertion duct 2 open proximate to the electrophoresis chamber 5 at the insertion section 20, the insertion electrodes 31 and 32 are in contact respectively with the liquid containing the target and with the electrophoretic material 53 in order to allow the generation of a more effective and controllable electrical field, and they create an adapted electrical field that injects the sample into the electrophoretic material 53. Such electrical field remains active for an appropriate period, evaluated to optimize the process of injection. After an appropriate time in order to obtain an effective dynamic injection and the appropriate concentration of the target, the field is switched off between the insertion electrodes 31 and 32 and, by way of the electrophoresis electrodes 51 and 52 arranged on opposite sides of the electrophoresis chamber 5, an electrical field is generated at right angles to the field generated by the insertion electrodes 31 and 32. Such electrical field determines the electrophoretic separation run, and is calibrated in intensity and duration so as to bring the electrophoretic line containing the target proximate to the extraction section 60 of the extraction duct 6.

At this point, the field between the electrophoresis electrodes 51 and 52 is conveniently switched off and, by way of the extraction electrodes 61 and 62, an electrical field is generated which passes through the extraction section 60 of the duct 6, drawing into it the previously-separated target and dissolving it in the adapted buffer solution optimized for the detection and quantification of the target.

An aspect of the present invention relates to a method of concentrating, purifying and detecting a biological and/or medical target of interest starting from a biological sample containing the target, said method said method being performed using the microfluidic device (1) described above and preferably comprising the following steps:

switching-on the insertion electrodes (31,32) for filling the insertion duct (2) with the biological sample containing the target;

when the insertion duct (2) filling is complete, switching-off the insertion electrodes (31,32) and switching-on the electrophoresis electrodes (51,52) to generate an electrophoretic run;

at the end of the electrophoretic running time, switching-off the electrophoresis electrodes (51,52) and switching-on the extraction electrodes (61,62) to extract the target and inject it into the detection chamber (8).

According to an embodiment of the present invention the voltage applied to the electrodes of the microfluidic device (1) is below 10V.

According to another embodiment of the present invention the voltage applied at the insertion electrodes (31,32) is between +4V and +6V, more preferably is +5V.

According to a further embodiment of the present invention the voltage applied at the electrophoretic electrodes (51,52) is between +3V and +8V, more preferably is between +3.5V and -+7V.

According to another embodiment of the present invention the voltage applied at the insertion electrodes (31,32) and/or at the electrophoretic electrodes (51,52) is a pulsed voltage, more preferably a square pulsed voltage, having preferably a duty cycle between 0.5 and 0.75 and a frequency of 10 kHz.

The run length is maximum in the case in which both injection and run are performed with pulsed voltage. In this case, a much smaller pH variation is induced at the injection site and the targets (e.g. proteins) are free to run immediately after the application of the run potential. Moreover, the effect of the Debye capacity and change of the pH are minimized during run, achieving higher mobility. Proteins move, for electrophoresis, only when there is an applied potential difference, so only for a fraction of the total electrophoretic time, depending on the duty cycle of the square wave. However, because of the limited pH variation their charge is conserved and the distance they tread is greater than in the constant potential electrophoresis. In conclusion, the pulsed electrophoresis appears more efficient than an electrophoresis with constant potential difference because proteins run more and there are little or none bubble formation.

In practice it has been found that the microfluidic device, particularly of the lab-on-chip type, for the detection of proteinic targets of medical interest in biological samples, according to the present invention, achieves the intended aim and objects since it ensures a greater and better manageability and an optimization of the conditions of detection and quantification of the target.

In particular, the microfluidic device, according to the invention, makes it possible to analyze a biological sample in the microfluidic device, which is made in a single chip.

Furthermore, the microfluidic device, according to the invention, does not require any particular activation of the surfaces through which the biological sample passes. In fact, during construction, assembly, or use of the device itself, no special processing of the surfaces is required in order to make them receptive to the various operations.

Another advantage of the microfluidic device, according to the invention, consists in that it ensures the conservability and unalterability of the biological sample and of the reference reagent solution.

Another advantage of the device, according to the invention, consists in that it does not require fixing of the target and of the detection reagents, since the isolation between the sections that define the device is provided directly by the electrophoretic material contained in the electrophoresis chamber.

Another advantage of the device, according to the invention, is to be able to concentrate, purify and condition, in the appropriate detection buffer, one or more targets initially contained in native fluids, treated or otherwise, in a single electrophoretic step by virtue of the dynamic injection of the target, or targets, into the electrophoretic material present in the electrophoretic chamber.

The possibility to inject the target into the electrophoretic chamber while the biological sample flows, in dynamic conditions, makes it possible to better concentrate the target, by accumulating a greater quantity thereof in the electrophoretic material and therefore enabling a more effective detection thereof in the detection chamber.

Another advantage of the microfluidic device, according to the invention, relates to the fact that it can easily find application not only in the clinical sector, but also in the sector of biological, biochemical, pharmacological and immunological research, as well as in the industrial sector, for example in the food industry or in environmental monitoring.

Another advantage of the microfluidic device, according to the invention, is that it makes it possible to perform operations of purification, concentration and conditioning of the target that are accurate and repeatable, as well as rapidly executed, as they do not require manipulation by the operator, thus also minimizing the risks of contamination and human error.

The microfluidic device, particularly of the lab-on-chip type, for the detection of proteinic targets of medical interest in biological samples, thus conceived, is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

According to a preferred embodiment of the invention the electrophoretic material (53) is customized electrophoresis gel and electrophoretic customized cellulose.

According to another preferred embodiment of the invention the electrophoretic material (53) is customized electrophoresis gel and electrophoretic customized cellulose having a pH between 5 and 8.9.

According to another preferred embodiment of the invention the electrophoretic material (53) is polyacrylamide gel. The polyacrylamide may be at 3-4% acrylamide in an appropriate buffer solution.

According to another embodiment of the invention, preferably the electrophoretic material is polyacrylamide gel at 4% acrylamide in 112 mM Tris Acetate, pH 7.0.

According to another embodiment of the invention, preferably the electrophoretic material is polyacrylamide gel at 3% acrylamide in 1.5M Tris-HCl, pH 8.9.

According to another further embodiment of the invention, preferably the electrophoretic material is polyacrylamide gel at 3% acrylamide in 20 mM Histidine, 35 mM MOPS at pH 5.5.

Where the technical features mentioned in any claim are followed by reference numerals and/or signs, those reference numerals and/or signs have been included for the sole purpose of increasing the intelligibility of the claims and accordingly, such reference numerals and/or signs do not have any limiting effect on the interpretation of each element identified by way of example by such reference numerals and/or signs.

The invention claimed is:

1. A microfluidic device for the concentration, purification, and detection of biological and/or medical targets of interest starting from a biological sample, which comprises:
   a capillary insertion duct for insertion of a biological sample containing a target;
   an electrophoresis chamber, containing an electrophoretic material stationary phase; said electrophoresis chamber being in capillary connection with said capillary insertion duct along an insertion section of said capillary insertion duct, on the bottom of the electrophoresis chamber;
   a pair of insertion electrodes arranged across said insertion section said pair of insertion electrodes comprising a first insertion electrode arranged on top of the electrophoresis chamber and a second insertion electrode arranged underneath the capillary insertion duct and being adapted to generate an electrical field capable of extracting and injecting dynamically, into said electrophoresis chamber, said target contained in said biological sample, while said biological sample is in motion along said insertion section, said target becoming concentrated in said electrophoresis chamber owing to said dynamic injection;
   a microfluidic pump, in capillary connection with said capillary insertion duct, which is configured to maintain said biological sample in motion along said capillary insertion duct at a speed adapted to allow said dynamic injection of said target into said electrophoresis chamber;
   said electrophoresis chamber comprising a pair of electrophoresis electrodes arranged on opposite lateral sides of the electrophoresis chamber at right angles with respect to said pair of insertion electrodes which are adapted to generate an electrical field capable of making said target concentrated in said electrophoresis chamber undergo a purifying electrophoretic run through said electrophoretic material;

a capillary extraction duct adapted to receive said target that has been concentrated and purified in said electrophoresis chamber; said capillary extraction duct having an extraction section defined by a longitudinal portion of the capillary extraction duct, said extraction section being in capillary connection with the electrophoresis chamber and arranged substantially parallel to the insertion section;

a detection chamber, in capillary connection with said capillary extraction duct, in which the presence is detected of said concentrated and purified target, a pair of extraction electrodes arranged across said extraction section, said pair of extraction electrodes comprising a first extraction electrode arranged on top of the electrophoresis chamber and a second extraction electrode arranged underneath the capillary extraction duct which are adapted to generate an electrical field capable of injecting, into said extraction section of said capillary extraction duct, said target that has been concentrated and purified in said electrophoresis chamber.

2. The microfluidic device according to claim 1, further comprising at least one single-use valve adapted to maintain in static position said target present in said capillary extraction duct.

3. The microfluidic device according to claim 2, further comprising a capillary suction duct, in capillary connection with said detection chamber and comprising said at least one single-use valve, the breakage of said at least one single-use valve favoring the movement of said target from said extraction duct to said detection chamber.

4. The microfluidic device according to claim 1, wherein said electrophoresis chamber comprises said pair of electrophoresis electrodes, said pair of insertion electrodes and said pair of extraction electrodes, said pair of insertion electrodes and said pair of extraction electrodes being arranged substantially at right angles with respect to said pair of electrophoresis electrodes, said pair of insertion electrodes and said pair of extraction electrodes generating respectively an insertion electrical field and an extraction electrical field substantially at right angles with respect to the electrophoresis electrical field generated by said pair of electrophoresis electrodes.

5. The microfluidic device according to claim 1, wherein the electrophoresis electrodes are arranged at two opposite sides of the electrophoresis chamber.

6. The microfluidic device according to claim 1, wherein the electrodes of said pair of electrophoresis electrodes are arranged at least partially in contact with said electrophoretic material.

7. The microfluidic device according to claim 1, wherein the injection electrodes are arranged respectively above and below the insertion section of the insertion duct, and the extraction electrodes are arranged respectively above and below the extraction section of the duct.

8. The microfluidic device according to claim 1, wherein the electrodes of said pair of insertion electrodes are arranged respectively in contact with said electrophoretic material and with said biological sample in motion along said insertion section of said capillary insertion duct.

9. The microfluidic device according claim 1, wherein the electrodes of said pair of extraction electrodes are arranged respectively in contact with said electrophoretic material and with said target present in said extraction section of said capillary extraction duct.

10. The microfluidic device according to claim 1, wherein an intensity of the electrical field generated by said pair of insertion electrodes is calibrated on the basis of one or more of the following parameters: a speed of flow of said biological sample imposed by said microfluidic pump, a specific mass of said target to be extracted from said biological sample, a specific charge of said target to be extracted from said biological sample.

11. The microfluidic device according to claim 1, wherein said capillary insertion duct is configured to be in fluidic connection with an outlet of a device for pre-treatment of said biological sample.

12. The microfluidic device of claim 1, wherein the microfluidic device is a lab-on-a chip type microfluidic device.

13. A method for concentrating, purifying and detecting a biological and/or medical target of interest starting from a biological sample containing the target, using the microfluidic device according to claim 1, said method comprising the following steps:
  switching-on the insertion electrodes for filling the insertion duct with the biological sample containing the target;
  when the insertion duct filling is complete, switching-off the insertion electrodes and switching-on the electrophoresis electrodes to generate an electrophoretic run;
  at the end of the electrophoretic running time, switching-off the electrophoresis electrodes and switching-on the extraction electrodes to extract the target and inject it into the detection chamber.

14. The method according to claim 13, wherein the insertion electrodes, the electrophoresis electrodes and the extraction electrodes are switched-on by applying a differential potential of below 10 V.

15. The method according to claim 13, wherein a voltage applied at the insertion electrodes and/or at the electrophoretic electrodes is a pulsed voltage.

16. The method according to claim, 15, wherein the voltage is a square pulsed voltage.

* * * * *